(12) United States Patent
Esch et al.

(10) Patent No.: US 10,862,715 B2
(45) Date of Patent: Dec. 8, 2020

(54) EQUALIZER AND METHOD FOR EQUALIZING A RECEIVE SIGNAL

(71) Applicant: Apple Inc., Cupertino, CA (US)

(72) Inventors: Thomas Esch, Kaarst (DE); Mihail Petrov, Unterhaching (DE); Tobias Scholand, Duisburg (DE); Michael Speth, Krefeld (DE); Norbert Neurohr, Unterhaching (DE)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 15/777,537

(22) PCT Filed: Nov. 9, 2016

(86) PCT No.: PCT/EP2016/077061
§ 371 (c)(1),
(2) Date: May 18, 2018

(87) PCT Pub. No.: WO2017/097527
PCT Pub. Date: Jun. 15, 2017

(65) Prior Publication Data
US 2018/0337804 A1 Nov. 22, 2018

(30) Foreign Application Priority Data
Dec. 11, 2015 (EP) .................................... 15199538

(51) Int. Cl.
*H04L 25/03* (2006.01)
*H04L 25/02* (2006.01)
*H04B 1/7105* (2011.01)

(52) U.S. Cl.
CPC ... *H04L 25/03019* (2013.01); *H04B 1/71055* (2013.01); *H04L 25/022* (2013.01);
(Continued)

(58) Field of Classification Search
CPC combination set(s) only.
See application file for complete search history.

(56) References Cited

U.S. PATENT DOCUMENTS 5,243,624 A * 9/1993 Paik .................. H04L 25/03038
375/232
5,243,642 A * 9/1993 Wise, Jr. ............... H04M 1/654
379/35

(Continued)

FOREIGN PATENT DOCUMENTS

WO    WO-01/20780 A1    3/2001
WO    WO-2004/098138 A1    11/2004

OTHER PUBLICATIONS

European Patent Office, European Search Report issued for EP 15199538.8, 4 pgs., dated Sep. 8, 2016.

*Primary Examiner* — Wednel Cadeau
(74) *Attorney, Agent, or Firm* — Eschweiler & Potashnik, LLC

(57) ABSTRACT

An equalizer includes: a channel estimator configured to generate a set of time-domain channel coefficients based on a receive signal; a frequency-domain transformer configured to generate a set of frequency-domain channel coefficients based on a frequency transform of the set of time-domain channel coefficients; an equalizer coefficient generator configured to generate a set of frequency-domain equalizer coefficients based on the set of frequency-domain channel coefficients; a time-domain transformer configured to generate a set of time-domain equalizer coefficients based on a time transform of the set of frequency-domain equalizer coefficients; and a filter configured to filter the receive signal based on a filter function that is based on the set of time-domain equalizer coefficients.

23 Claims, 9 Drawing Sheets

(52) U.S. Cl.
CPC ...... *H04L 25/0204* (2013.01); *H04L 25/0212* (2013.01); *H04L 25/03133* (2013.01); *H04L 25/03159* (2013.01); *H04B 2201/7097* (2013.01)

(56) References Cited

U.S. PATENT DOCUMENTS

| | | | | |
|---|---|---|---|---|
| 5,285,472 | A * | 2/1994 | Leonard | H04B 1/7087 |
| | | | | 375/150 |
| 6,834,109 | B1 * | 12/2004 | Pare, Jr. | H04B 3/32 |
| | | | | 375/254 |
| 9,112,743 | B1 * | 8/2015 | Shirakawa | H04L 27/265 |
| 2004/0213339 | A1 * | 10/2004 | Smee | H04L 25/0314 |
| | | | | 375/232 |
| 2005/0064833 | A1 * | 3/2005 | Galperin | H04L 25/03146 |
| | | | | 455/203 |
| 2011/0007792 | A1 * | 1/2011 | Kimata | H04L 25/03828 |
| | | | | 375/232 |
| 2011/0033012 | A1 | 2/2011 | Matsuoka et al. | |
| 2011/0087104 | A1 * | 4/2011 | Moore | A61B 8/12 |
| | | | | 600/447 |
| 2012/0099660 | A1 * | 4/2012 | Mun | H04L 29/00 |
| | | | | 375/240.27 |
| 2012/0281747 | A1 | 11/2012 | Abrishamkar et al. | |
| 2016/0081105 | A1 * | 3/2016 | Mizusawa | H04L 5/14 |
| | | | | 370/281 |

* cited by examiner

EQUALIZER AND METHOD FOR EQUALIZING A RECEIVE SIGNAL

FIELD

The disclosure relates to an equalizer and a method for equalizing a receive signal. In particular, the disclosure relates to a hybrid frequency-time domain equalization technique for CDMA (Code Division Multiple Access) systems that is applicable to single-carrier receivers and specifically to receivers for the third generation cellular communication standard UMTS.

BACKGROUND

In most wireless systems 100, as e.g. illustrated in FIG. 1, the channel between the NodeB transmitter 110 and the UE (User Equipment, mobile terminal) receiver 120 is typically a multipath channel, in which several versions 101, 102, 103 of the transmitted signal 101 are received with different delays and complex gains (amplitude & phase). When these delays exceed a symbol duration, inter-symbol interference (ISI) may occur. Another effect of the multipath behavior may be that the channel becomes frequency selective, which is referred to as frequency-selective fading.

Modern cellular communication systems may also be affected by inter-cell interference. As the allocated communication spectrum is aggressively reused between cells, each mobile receiver 120 also receives the signals 104 transmitted by neighboring NodeB(s) 111 in addition to those transmitted by the serving NodeB(s) 110.

In order to combat inter-symbol and inter-cell interference, linear channel equalizers may be used. The equalization process attempts to minimize the errors in the received signal. There is a need to improve the equalization process in the receiver 120.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
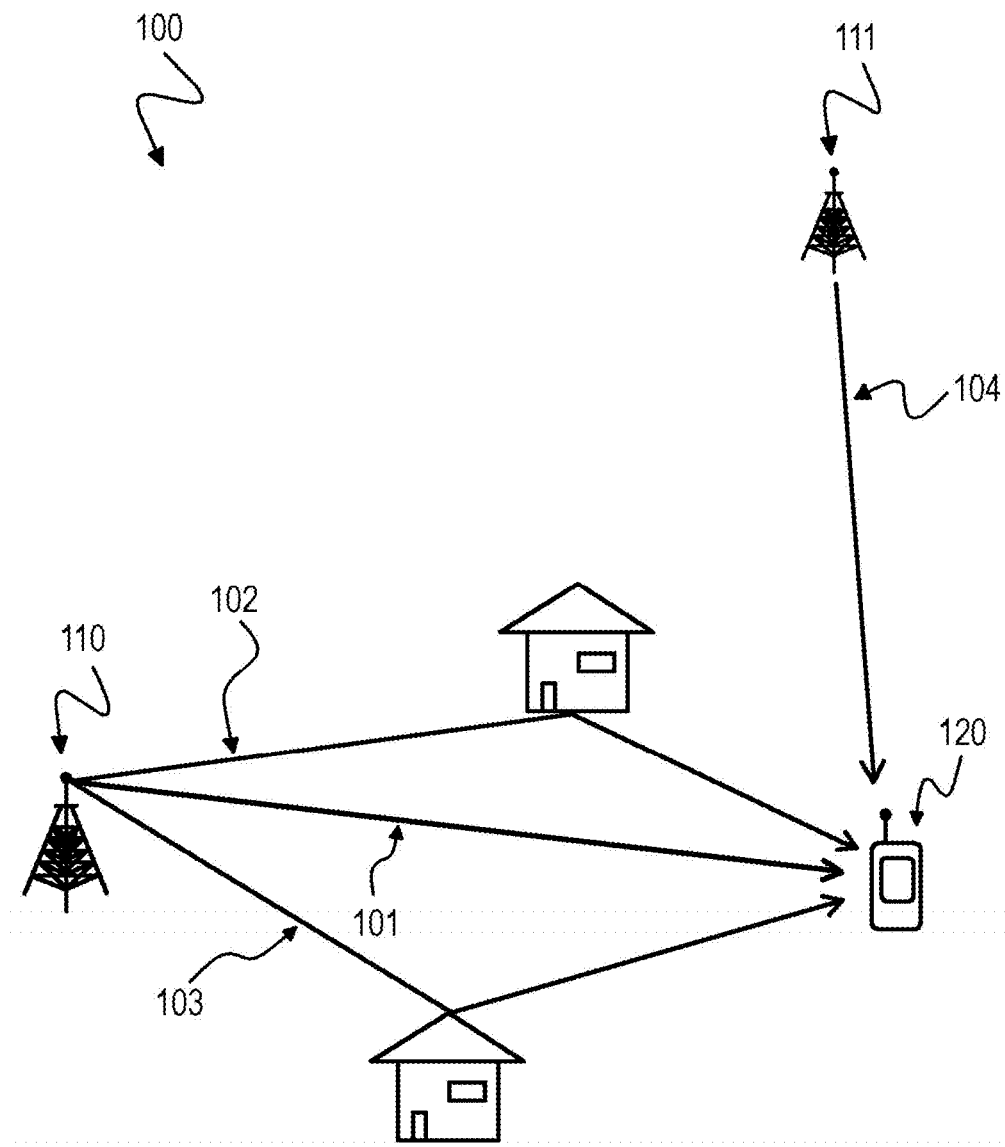
FIG. 1 is a schematic diagram illustrating an exemplary wireless communications system 100 including a serving radio cell 110, a neighboring radio cell 111 and a mobile terminal 120.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". Also, the terms "exemplary", "for example" and "e.g." are merely meant as an example, rather than the best or optimal.

The devices and methods described herein may be used for various wireless communication networks such as Code Division Multiple Access (CDMA), Time Division Multiple Access (TDMA) and Frequency Division Multiple Access (FDMA) networks. The terms "network" and "system" may be used interchangeably. A CDMA network may implement a radio technology such as Universal Terrestrial Radio Access (UTRA), cdma2000, etc. UTRA includes Wideband-CDMA (W-CDMA) and other CDMA variants. Cdma2000 covers IS-2000, IS-95, and IS-856 standards. A TDMA network may implement a radio technology such as Global System for Mobile Communications (GSM) and derivatives thereof such as e.g. Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS).

In radio communications systems, a transmitter transmitting one or more radio communications signals on one or more radio communications channels may be present. In particular, the transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver, a handheld radio device or any similar device. In particular, radio communications systems as disclosed herein may include UMTS systems which may conform to the 3GPP standard for UMTS systems. Radio communications signals as disclosed herein may be provided in UMTS systems, in particular over radio communications physical channels, such as primary common pilot channels, secondary common pilot channels, dedicated physical channels, dedicated physical control channels or similar channels according to the UMTS standard.

The devices and methods described herein may be applied in Multiple-Input Multiple-Output (MIMO) systems. Multiple-Input Multiple-Output (MIMO) wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which may be described by the channel matrices between respective antennas of the transmitter and respective antennas of the receiver.

The devices and methods described herein apply equalization techniques. Equalization is the reversal of distortion incurred by a signal transmitted through a channel. Equalizers, also referred to as channel equalizers are used to render the frequency response of a communication channel flat from end-to-end. When a channel has been equalized, the frequency domain attributes of the signal at the input are reproduced at the output. Equalization may be implemented in time-domain (TD) and in frequency-domain (FD).

Figure 2:
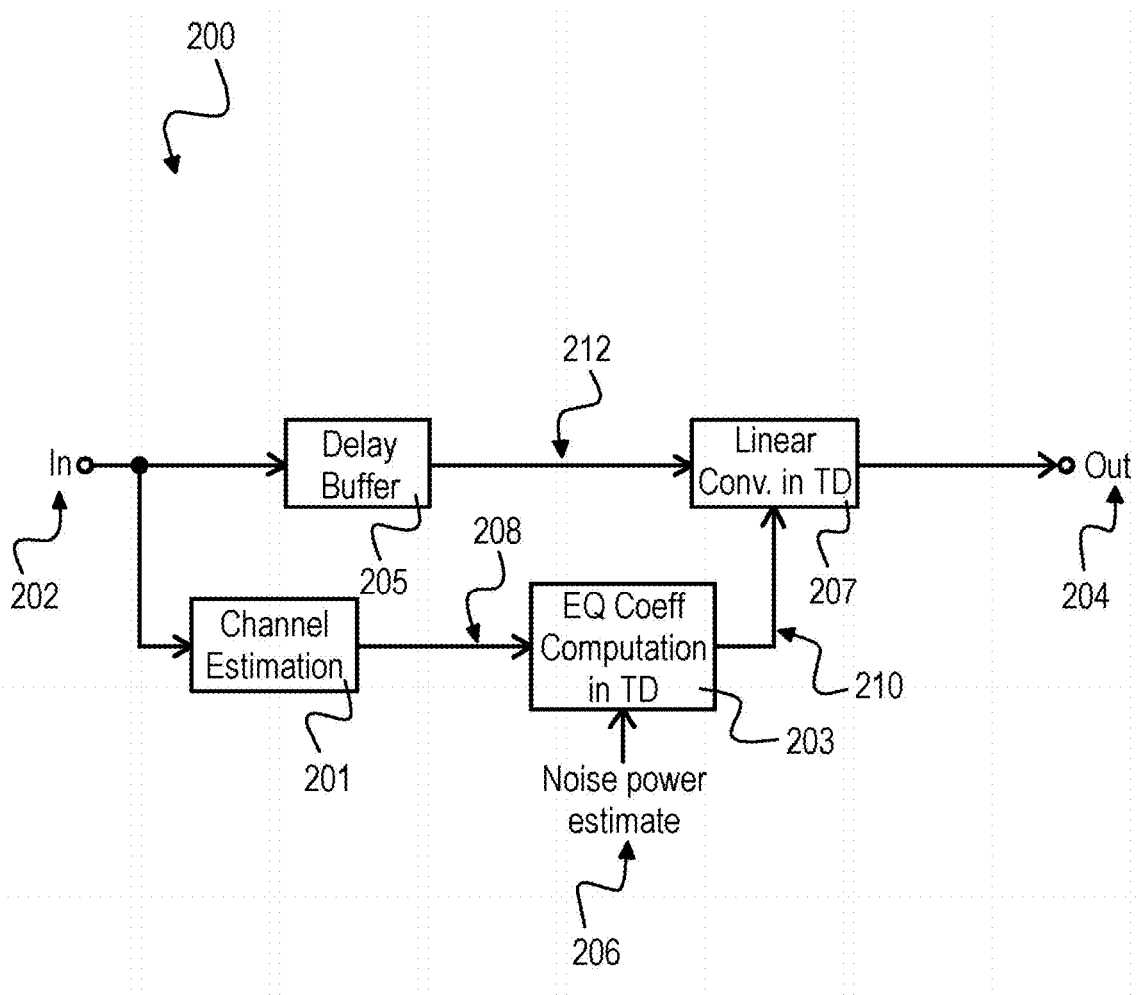
FIG. 2 illustrates a block diagram of a time-domain (TD) equalizer 200.

For single-carrier systems the channel equalizers are conventionally realized in time domain as finite-impulse-response filters. This is referred to as time-domain equalization (TDE) as depicted in FIG. 2. The TD equalizer 200 includes a channel estimator 201 for estimating TD channel coefficients 208 by evaluating the receive signal 202. Based on the TD channel coefficients 208, an equalizer coefficient computation unit 203 computes time domain equalizer coefficients 210, which are applied to a time domain linear convolution filter 207 for filtering the delayed input signal 212 and to generate the output signal 204. A delay buffer 205 delays the input signal 202 to generate the delayed input signal 212. A main challenge consists in computing the equalizer filter coefficients 210 based on channel 208 and noise power estimates 206. The standard approach includes the inversion of a square channel matrix, wherein the size of the matrix depends on the equalizer length. In order to cope with large channel delay spreads, large equalizer lengths are required, making these methods computationally very intensive. The complexity of a matrix inversion increases with at least the square of the matrix size, even when approximate solutions are used.

Figure 3:
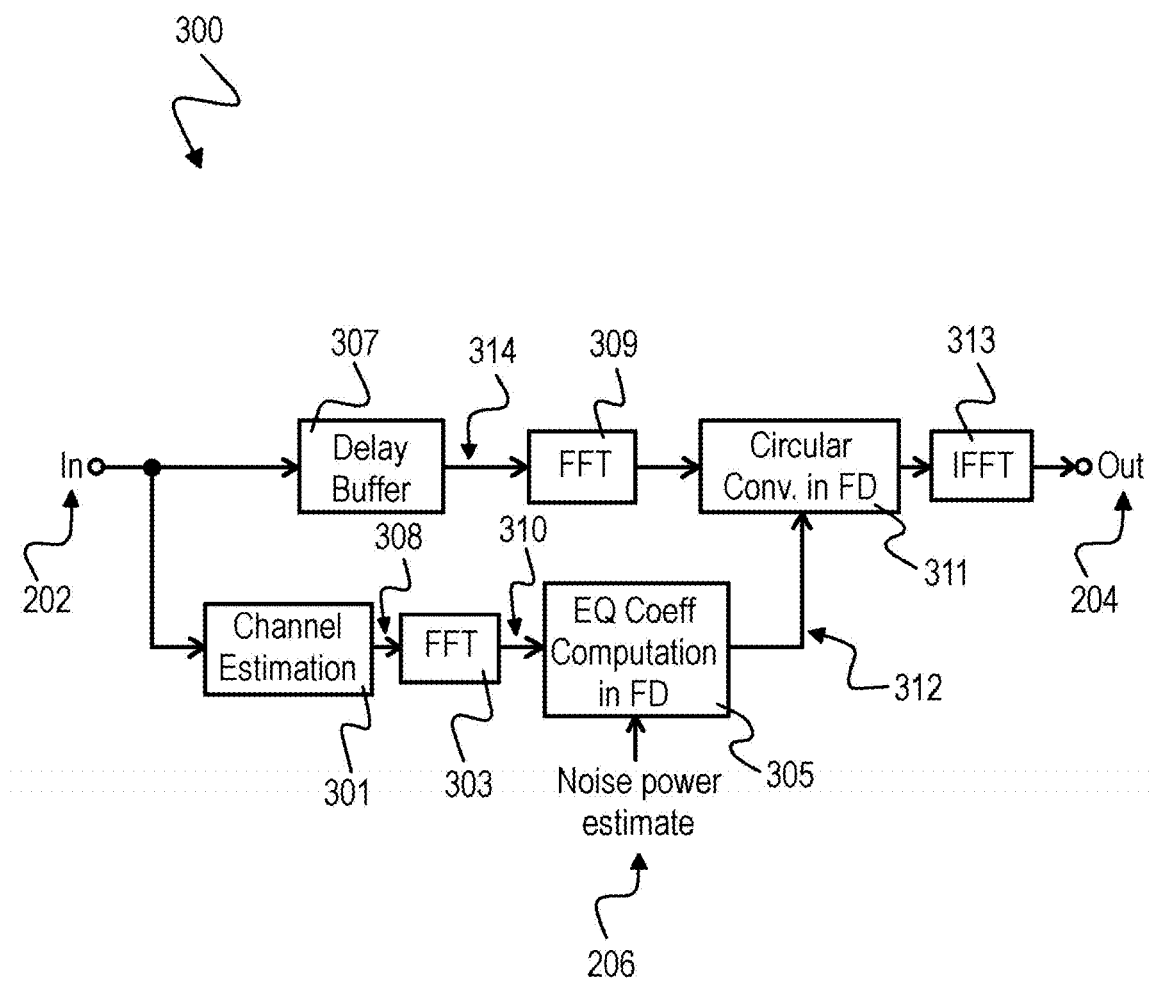
FIG. 3 illustrates a block diagram of a frequency-domain (FD) equalizer 300.

Frequency-domain equalization (FDE) as depicted in FIG. 3 on the other hand may be considered as a candidate technique to provide good performance at a much lower computational complexity.

The FD equalizer 300 includes a channel estimator 301 for estimating TD channel coefficients 308 by evaluating the receive signal 202. The TD channel coefficients 308 are transformed by an FFT unit 303 into the frequency domain 310. An equalizer coefficient computation unit 305 computes frequency domain equalizer coefficients 312 by evaluating the frequency domain channel coefficients 310 and a noise power estimate 206. The frequency domain equalizer coefficients 312 are applied to a circular convolution frequency domain filter 311 for filtering the delayed input signal transformed into the frequency domain. An output of the filter 311 is transformed by an IFFT unit 313 back into the time domain to generate the output signal 204. A delay buffer 307 delays the input signal 202 to generate the delayed input signal 314 which is transformed by an FFT unit 309 to the frequency domain to obtain the input of the circular convolution frequency domain filter 311.

Computing the equalization coefficients 312 in the frequency domain requires the inversion of small-sized matrices for each frequency bin, which is typically much less complex than a TDE with same performance. The actual filtering 311 in the FDE is also done in the frequency domain by circular convolution. Therefore, the delayed input signal 314 needs to be transformed to the frequency domain as well. Finally, the equalized signal is transformed back to the time domain.

In this disclosure a new equalization technique is described using a hybrid approach: the equalizer coefficients are determined in the frequency domain (like for the FDE 300) whereas the filtering is performed in the time domain (like for the TDE 200). The presented new equalization technique combines the advantages of TDE 200 and FDE 300 as described above and is referred hereinafter as "hybrid equalization" or "hybrid frequency-time domain equalization".

Figure 4:
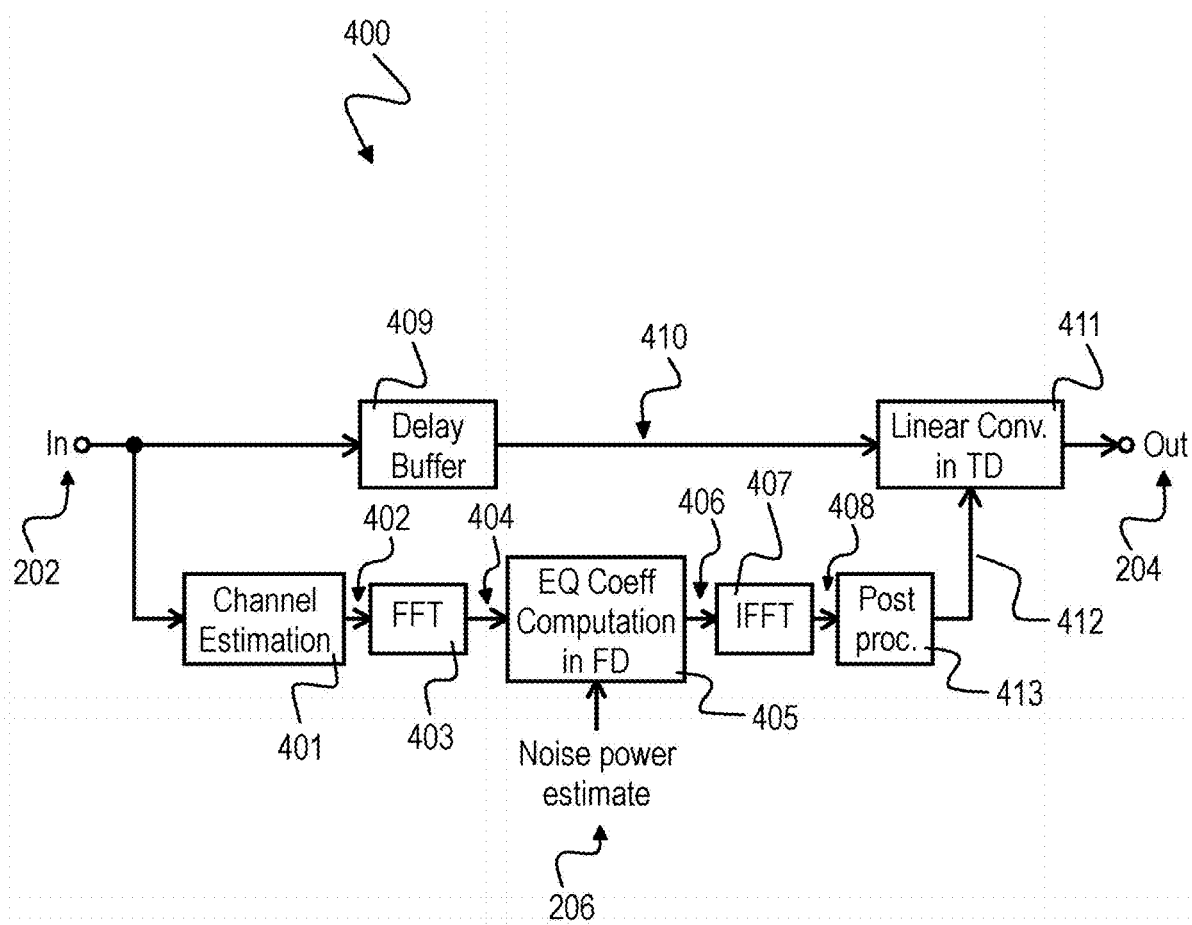
FIG. 4 illustrates a block diagram of a hybrid frequency-time domain equalizer 400 in accordance with the disclosure.

FIG. 4 illustrates a block diagram of a hybrid frequency-time domain equalizer 400 in accordance with the disclosure. The hybrid equalizer 400 includes a channel estimator 401, a frequency-domain transformer 403, an equalizer coefficient generator 405, a time-domain transformer 407 and a filter 409.

The channel estimator 401 generates a set of time-domain channel coefficients 402 based on a receive signal 202. The frequency-domain transformer 403 generates a set of frequency-domain channel coefficients 404 based on a frequency transform of the set of time-domain channel coefficients 402. The equalizer coefficient generator 405 generates a set of frequency-domain equalizer coefficients 406 based on the set of frequency-domain channel coefficients 404. The time-domain transformer 407 generates a set of time-domain equalizer coefficients 408 based on a time transform of the set of frequency-domain equalizer coefficients 406. The filter 411 filters the receive signal 202 based on a filter function that is based on the set of time-domain equalizer coefficients 408.

The frequency-domain transformer 403 may perform a Fast Fourier Transform (FFT). The frequency transform may be based on the FFT. The time-domain transformer 407 may perform an Inverse Fast Fourier Transform (IFFT). The time transform may be based on the IFFT.

A size of the FFT may be adjustable while filtering the receive signal 202 by the filter 411.

Figure 8:
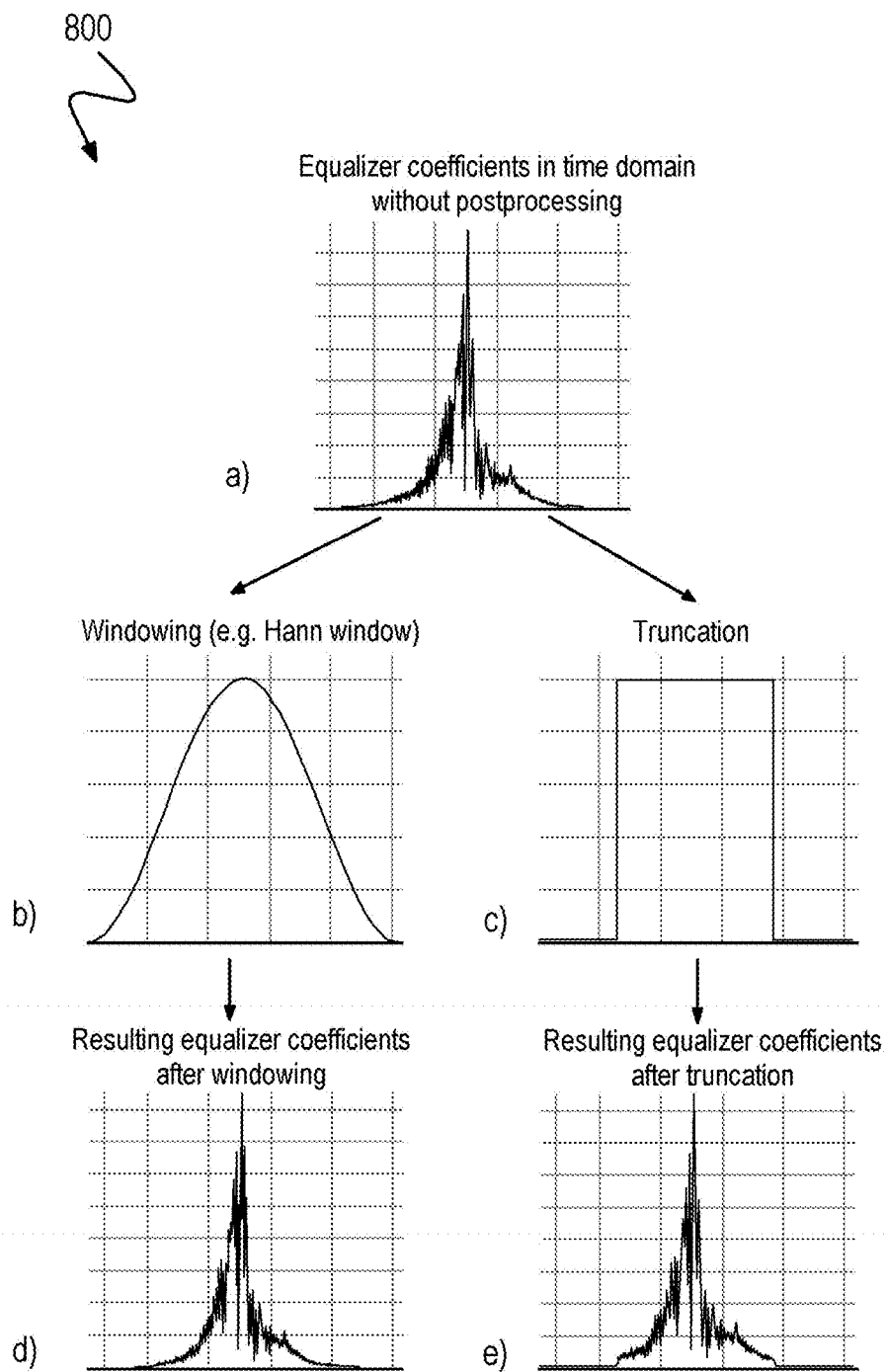
FIGS. 8a to 8e illustrate exemplary sets of equalizer coefficients and window functions for different implementations of the postprocessor according to the disclosure.

The equalizer 400 may further include a post-processor 413 for post-processing the set of time-domain equalizer coefficients 408 by applying windowing, Hann windowing or truncation, for example as described below with respect to FIG. 8.

The equalizer 400 may further include a delay buffer 409 for compensating for a system delay, i.e. a delay of at least one of the following blocks: the channel estimator 401, the frequency-domain transformer 403, the equalizer coefficient generator 405, the time-domain transformer 407, the post-processor 413.

The filter 411 may include a finite impulse response (FIR) filter for performing a linear convolution of the receive signal 202 based on the set of time-domain equalizer coefficients 408.

The set of time-domain equalizer coefficients 408 and the set of time-domain channel coefficients 402 may include a same number of coefficients.

The time-domain transformer 407 may update the set of time-domain equalizer coefficients 408 based on a block length of the time-domain transformer 407.

The filter 411 may update the filter function with the updated set of time-domain equalizer coefficients based on the block length of the time-domain transformer 407.

The equalizer coefficient generator 405 may generate the set of frequency-domain equalizer coefficients 406 based on a minimum mean square error (MMSE) estimation.

The channel estimator 401 may generate the set of time-domain channel coefficients 402 based on a known reference signal pattern. The channel estimator 401 may generate the set of time-domain channel coefficients 402 based on a correlation of a received pilot pattern included in the receive signal 202 with the known reference signal pattern.

The hybrid equalizer 400 as described above with respect to FIG. 4 may combine the advantages of the two equalizer solutions (TDE and FDE, see FIGS. 2 and 3), which are the performance of the TDE, the low complexity of the FDE, the scalability of the TDE and the low data path latency of the TDE, as described in the following.

Figure 5:
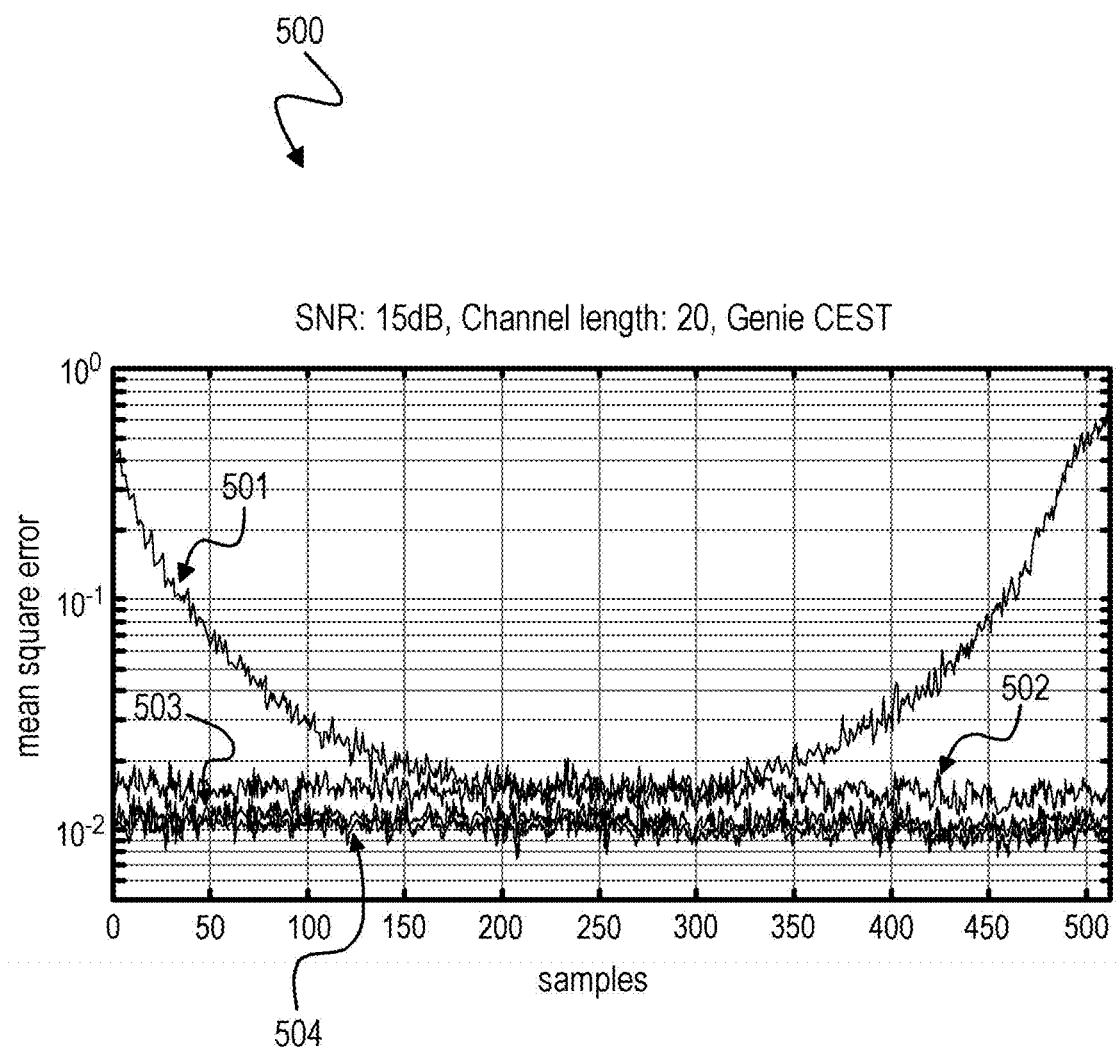
FIG. 5 illustrates an exemplary performance diagram 500 illustrating mean square error (MSE) of the hybrid frequency-time domain equalizer 400 in comparison to the TD equalizer 200 and the FD equalizer 300.

With respect to the performance, in terms of mean square error (MSE), the TDE performs better than the FDE of the same equalizer length, as the FDE assumes the input signal to be periodic (cyclic convolution) which is usually not the case (see e.g. the results in FIG. 5).

With respect to complexity, for a reasonable equalizer length, the computational complexity of the FDE may be much smaller than the computational complexity of the TDE. Moreover, this complexity increases linearly with the equalizer length. As mentioned above, most efforts have to be spent to determine the equalizer coefficients, for which the inversion of one large matrix (TDE) or many (depending on FFT size) small matrices (FDE) is required. As the complexity of a matrix inversion increases with at least the square of the matrix size, the FDE may have an advantage here.

In terms of scalability the TDE is more flexible than the FDE. In order to efficiently implement an (I)FFT, the FFT size, i.e. the equalizer length, should be a power of 2. In contrast, the TDE supports any possible equalization length.

The main latency of the FDE depends on the block/FFT size and thus may be larger than for the TDE as the linear convolution in time domain can be implemented with a very low latency. For the FDE the typical latency is of at least two blocks and is introduced by the FFT+IFFT pair in the data path.

The calculation of the equalizer coefficients may represent the most crucial part in the equalizer in terms of complexity. The hybrid equalizer 400 determines the equalizer coefficients in the frequency domain and thus offers reduced complexity compared to the TDE 200 for reasonable equalizer lengths. Depending on the realization/implementation of the (I)FFT blocks and the convolution in the time domain, the disclosed hybrid equalizer 400 is almost on par with the FDE 300 regarding the computational complexity. It is to be noted that the FDE 300 requires one additional FFT block in order to transform the received input signal to the frequency domain. On the other hand, the hybrid equalizer 400 may require a finite-impulse-response filter to perform the linear convolution.

Regarding scalability/flexibility, the disclosed hybrid equalizer 400 may show similar advantages as the TDE 200. As the convolution is realized in time domain, basically any equalizer length can be supported. Assuming a given equalizer length L, the size M of the FFT used in the calculation of the equalizer coefficients is chosen as the smallest power of 2 that can accommodate that length with $M=2^m \geq L$. Afterwards, the resulting equalizer coefficients can be truncated, e.g. by windowing, to the desired length L. In the FDE case 300 the flexibility is also limited by the fact that the overlap region between consecutive FFT blocks needs to have a certain minimum length below which the performance would degrade severely. This will limit the smallest FFT block size that can be used. No such constraint exists for TDE 200, where even an equalizer of length one can be used.

In terms of latency, the disclosed hybrid equalizer 400 shows a similar behavior than the TDE 200 as the convolution is also performed in time domain.

FIG. 5 illustrates an exemplary performance diagram 500 illustrating a mean square error (MSE) of the hybrid frequency-time domain equalizer 400 in comparison to the TD equalizer 200 and the FD equalizer 300. The curve 501 depicts a performance of the FDE 300, the curve 502 depicts a performance of the hybrid equalizer 400 without post-processing, the curve 503 depicts a performance of the hybrid equalizer 400 with post-processing, and the curve 504 depicts a performance of the TDE 200.

In order to evaluate the MSE performance, the three equalizer types TDE 200, FDE 300 and the disclosed hybrid equalizer 400 have been implemented and evaluated in a Matlab simulation based on a simple transmission model where a random target signal is transmitted over a random channel of length N and disturbed by AWGN at a given signal-to-noise-ratio (SNR). FIG. 5 shows the mean square error individually for each sampling point in a block assuming genie channel estimation exemplarily for the operating point N=20, M=L=512, SNR: 15 dB.

It can be seen that the FDE 501 performs worst and that its mean error depends on the sample position within the block. The FDE 501 performs cyclic convolution block-wise assuming that the input signal is periodic. As this is in general not the case, the mean square error increases towards the block edges.

In contrast, the mean error of the disclosed hybrid equalizer 502, 503 is constant for all samples, since the linear convolution in time domain is performed continuously rather than block-wise. If no post-processing is applied 502, this mean error is the smallest mean error of the FDE 501, which is that of the samples in the middle of a block. The equalizer coefficients are also derived in the frequency domain under the assumption that the input signal is periodic. Therefore it may be beneficial to attenuate the "outer" equalizer coefficients of the equalizer impulse response in the time domain by applying an additional window, such as Hann for instance. As can be seen in the figure, the performance of the proposed solution comes quite close to the performance of the TDE 504 which is optimal in this case, but computationally much more complex. Assuming that the complexity of the equalizer coefficients calculation scales quadratically with the equalizer length, calculating the coefficients in the frequency domain requires only ~1% of the respective TDE complexity for a block length of 512.

Figure 6:
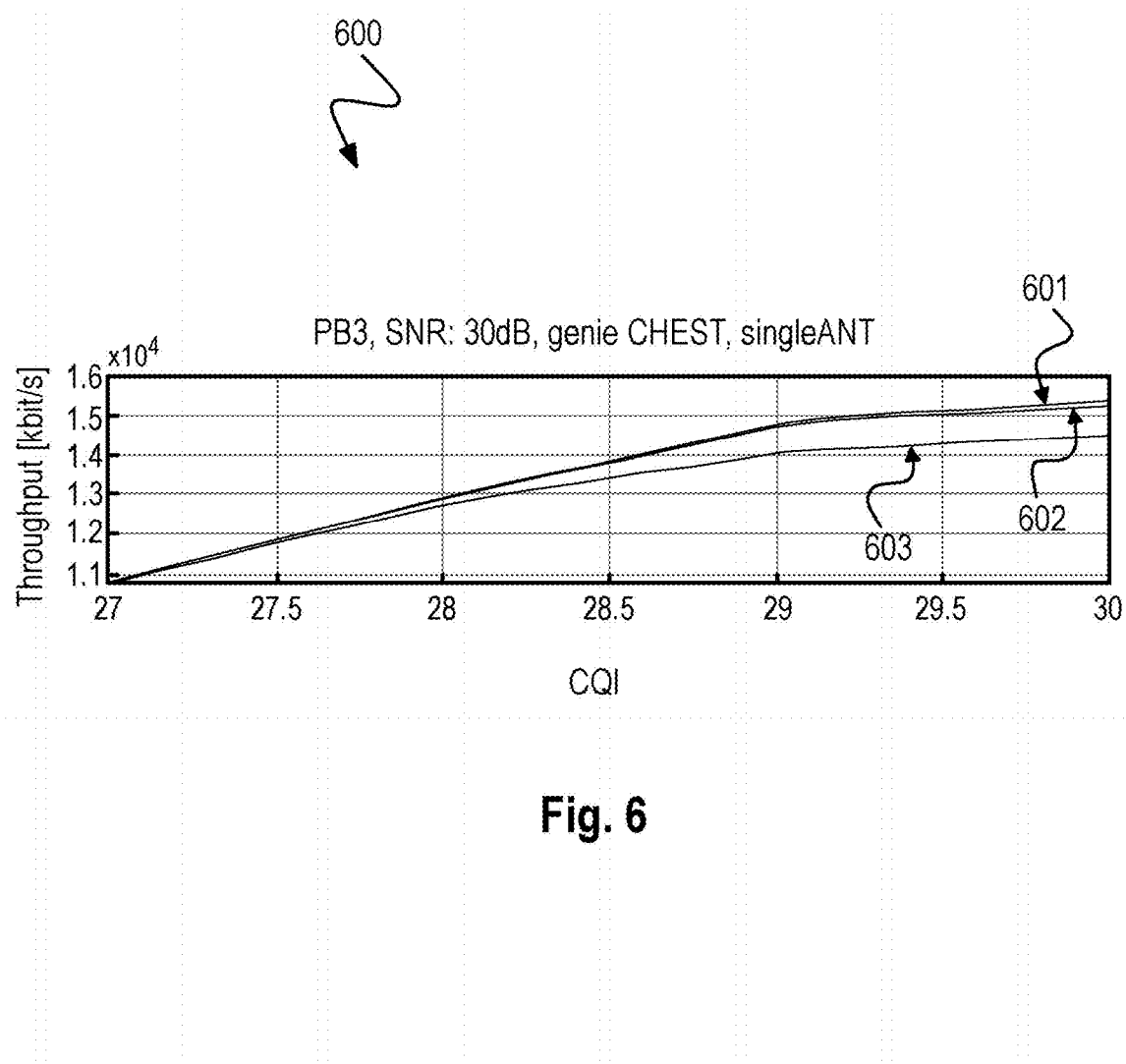
FIG. 6 illustrates an exemplary performance diagram 600 illustrating data throughput of the hybrid frequency-time domain equalizer 400 in comparison to the TD equalizer 200 and the FD equalizer 300 for an equalizer length of 1024.

FIG. 6 is an exemplary performance diagram 600 illustrating a data throughput of the hybrid frequency-time domain equalizer 400 in comparison to the TD equalizer 200 and the FD equalizer 300 for an equalizer length of 1024.

In order to demonstrate the performance of the disclosed hybrid equalizer 400 in a realistic WCDMA system, the different equalizers have been implemented and tested in a Matlab HSDPA link-level simulation chain. FIG. 6 shows the throughput performance of all three equalizers 200, 300, 400 in a "PB3 channel" scenario at 30 dB SNR for different CQIs (channel quality indices). All equalizers 200, 300 and 400 use the same equalizer length 1024.

The curve 601 depicts a performance of the TDE 200, the curve 602 depicts a performance of the hybrid equalizer 400 with Hann windowing, and the curve 603 depicts a performance of the FDE 300.

It can be seen that the disclosed hybrid equalizer 602 (with additional Hann windowing) again outperforms the FDE 603 and achieves almost the same throughput as the TDE 601, which would not be practical to implement for the TDE 200 due to its high computational complexity.

Figure 7:
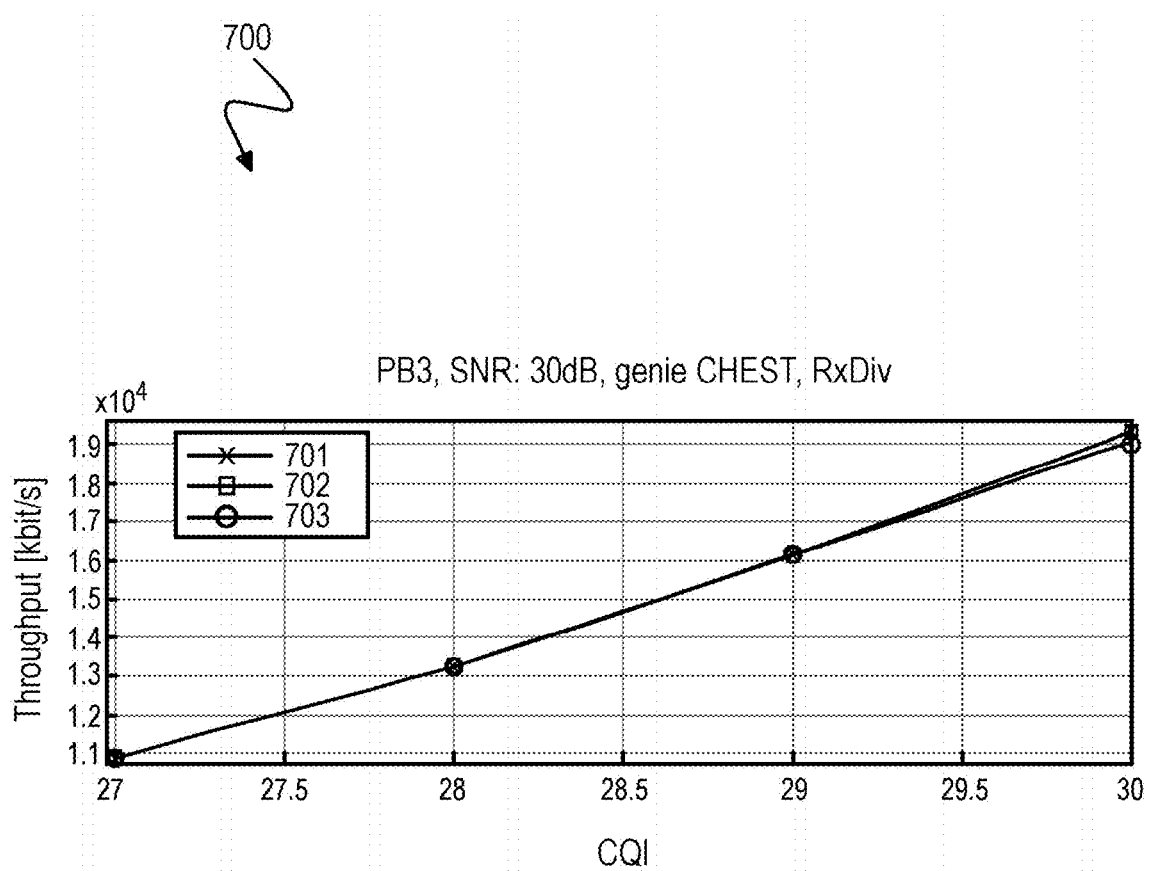
FIG. 7 illustrates an exemplary performance diagram 700 illustrating data throughput of the hybrid frequency-time domain equalizer 400 for different equalizer lengths.

FIG. 7 is an exemplary performance diagram 700 illustrating data throughput of the hybrid frequency-time domain equalizer 400 for different equalizer lengths.

The curve 701 depicts a performance of the disclosed hybrid equalizer 400 with FFT size M=1024, equalizer length L=1024 and Hann windowing. The curve 702 depicts a performance of the disclosed hybrid equalizer 400 with FFT size M=1024, equalizer length L=512 and Hann windowing. The curve 703 depicts a performance of the disclosed hybrid equalizer 400 with FFT size M=1024, equalizer length L=256 and Hann windowing.

An additional advantage of the disclosed hybrid equalizer 400 may be the possibility to easily change the equalizer length in the post-processing block 413 during runtime if desired. In use cases for instance, where the equalizer length must not be as long as the FFT size, the equalizer coefficients 408 can adaptively been truncated to the desired length in order to save complexity for the subsequent linear convolution 411 and to save memory if the equalizer coefficients 408 have to be stored for further processing, for example interference cancellation. In e.g. an RxDiv use case the equalizer length usually does not have to be as large as in a single antenna use case. Therefore, the equalizer coefficients 408 can be computed in the frequency domain with FFT size M and afterwards easily been truncated in time domain to desired length L without losing performance as can be seen from FIG. 7.

The new hybrid equalizer solution may also mitigate the risk of changing an existing TDE implementation. Completely switching to an FDE solution (in order to support larger equalizer lengths) would increase the implementation risk significantly as considerable changes have to be made also to the data path. Using the disclosed hybrid equalizer 400 instead, the actual equalization would still be realized by convolution in time domain, only with a larger number of coefficients.

Another aspect that contributes towards risk mitigation is that both algorithms (time domain and frequency domain) for computing the equalizer coefficients can be implemented in parallel on the same DSP or ASIC. If it turns out that the hybrid solution has any shortcomings in some use cases, the previous solution, e.g. TDE 200 or FDE 300, may be used instead.

The basic pros and cons of the TDE 200, FDE 300 and the disclosed hybrid equalizer 400 are summarized in Table 1.

TABLE 1

The basic pros and cons of the TDE 200, FDE 300 and the hybrid equalizer 400

|  | TDE 200, FIG. 2 | FDE 300, FIG. 3 | Hybrid Equalizer 400, FIG. 4 |
| --- | --- | --- | --- |
| Performance (same EQ length) | + | − | + |
| Computational Complexity (same EQ length) | − | + | + |
| Flexibility/ Scalability | + | − | + |
| Data Path Latency | + | − | + |

FIGS. 8a to 8e illustrate exemplary sets of equalizer coefficients and window functions for different implementations of the postprocessor of the hybrid equalizer 400 according to the disclosure. In FIG. 8a equalizer coefficients in time domain without post-processing are depicted. FIG. 8b shows an exemplary Hann window, and FIG. 8d shows the post-processed equalizer coefficients after post-processing, i.e. multiplication in time-domain with the Hann window of FIG. 8b. FIG. 8c shows an exemplary truncation window, and FIG. 8e shows the post-processed equalizer coefficients after post-processing, i.e. multiplication in time-domain with the truncation window of FIG. 8c or simply truncation of the equalizer coefficients of FIG. 8a according to the desired truncation length.

In the following, an example of the hybrid equalizer 400 as described above with respect to FIG. 4 using post-processing is described. At first, channel estimation 401 may be performed in the time domain, e.g. based on the input samples 202 from a DigRF (Digital Radio Frequency) interface. The resulting channel estimates may be transformed to frequency domain using an FFT 403 of size M. Based on these channel estimates 404 and using additional noise power estimates 206 as parameters, the equalizer coefficients 406 may be determined in the frequency domain. The coefficients may be optimized in the LMMSE sense. Afterwards, the equalizer coefficients 406 may be transformed back in the time domain 408 where they may be further post-processed 413 in order to either truncate the equalizer coefficients 408 to a desired equalizer length and/or apply an additional windowing (e.g., by using a Hann window) in order to limit the impact of the "outer" equalizer coefficients. As mentioned before the equalizer in the frequency domain may be derived under the assumption that the input signal 202 is period which generally is not the case. Therefore, depending on the specific scenario and the equalizer length, the additional windowing can be beneficial to improve performance.

In FIG. 8d, the resulting equalizer coefficients are depicted after windowing, e.g. by using a Hann window as depicted in FIG. 8b applied to the equalizer coefficients in time domain as depicted in FIG. 8a. In FIG. 8e, the resulting equalizer coefficients are depicted after truncation, e.g. by using a truncation window as depicted in FIG. 8c applied to the equalizer coefficients in time domain as depicted in FIG. 8a.

Figure 9:
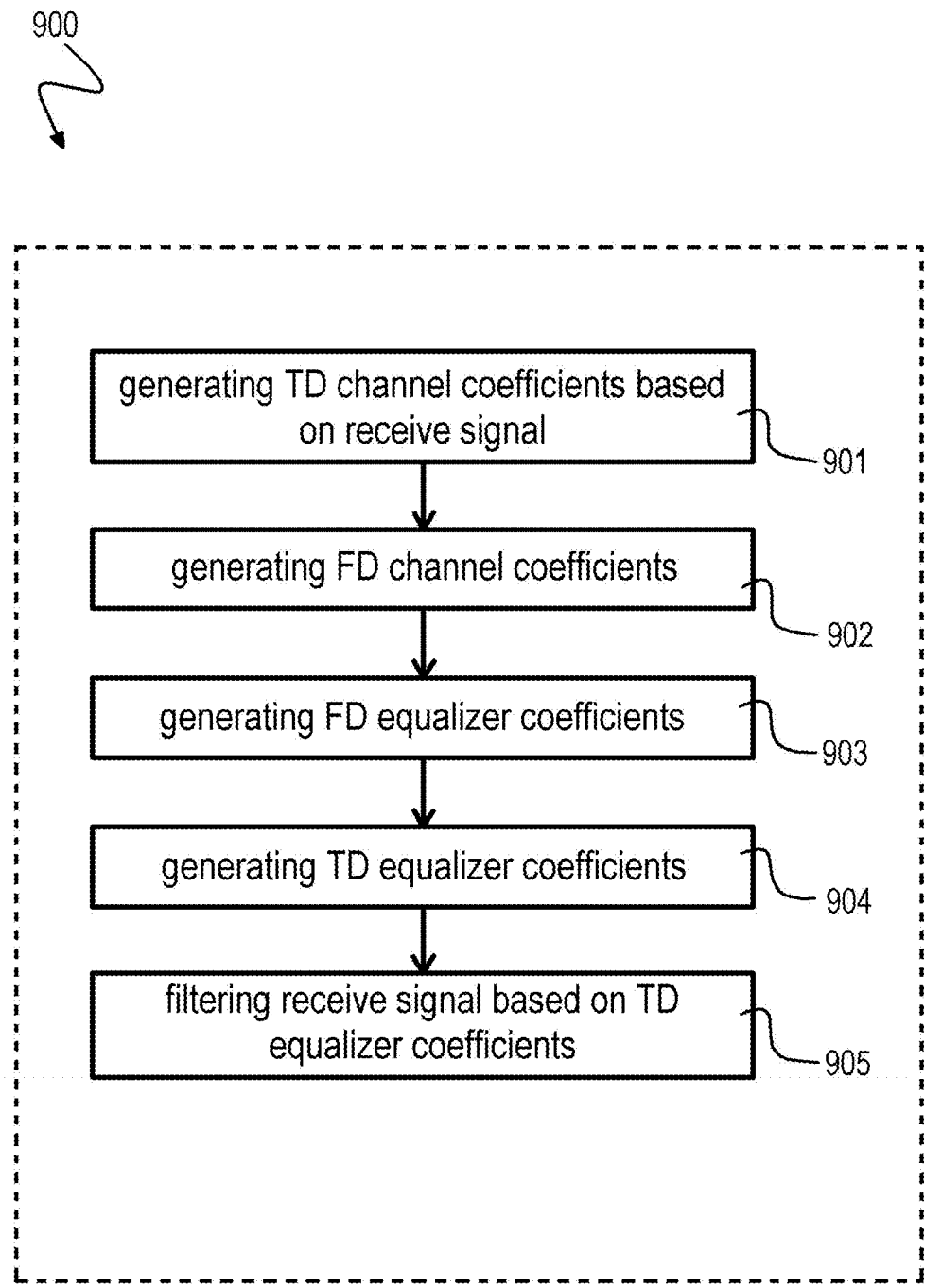
FIG. 9 illustrates a schematic diagram of a method 900 for equalizing a receive signal in accordance with the disclosure.

FIG. 9 illustrates a schematic diagram of a method 900 for equalizing a receive signal in accordance with the disclosure.

In wireless receiver systems 100 as depicted in FIG. 1, the equalization is performed either completely in time-domain (TDE) (see FIG. 2) or completely in frequency-domain (FDE) (see FIG. 3) with both methods having their own pros and cons with respect to performance, computational complexity, flexibility and latency. In this disclosure a novel hybrid equalization technique is presented which offers the advantages of both approaches. In order to equalize the received signal, the new method performs the following blocks:

Estimate the channel impulse response in the time domain.

Convert the impulse response to the frequency domain.

Compute equalizer coefficients in the frequency domain.

Convert the equalizer coefficients back to the time domain.

Optionally postprocess the equalizer coefficients in the time domain, e.g. by truncation or windowing according to a desired equalizer length.

Perform the equalization in the time domain through linear convolution of the received input signal with the resulting equalizer coefficients.

Such method 900 for equalizing a receive signal, as depicted in FIG. 9 includes the following blocks: generating 901 a set of time-domain channel coefficients based on the receive signal; generating 902 a set of frequency-domain channel coefficients based on a frequency transform of the set of time-domain channel coefficients; generating 903 a set of frequency-domain equalizer coefficients based on the set of frequency-domain channel coefficients; generating 904 a first set of time-domain equalizer coefficients based on a time transform of the set of frequency-domain equalizer coefficients; and filtering 905 the receive signal based on a first filter function that is based on the first set of time-domain equalizer coefficients.

The method 900 may further include post-processing the first set of time-domain equalizer coefficients, for example by truncation or windowing according to a predetermined equalizer length.

The method 900 may further include the blocks: generating a second set of time-domain equalizer coefficients based on the set of time-domain channel coefficients; and switching the filtering 905 of the receive signal from a second filter function that is based on the second set of time-domain equalizer coefficients to the first filter function.

The presented techniques offer the possibility to efficiently balance performance and computational complexity of the 3G modem in one example. With the presented hybrid equalizer 400 as described above with respect to FIG. 4 and the method 900 it may be possible to achieve (almost) the same performance in terms of throughput/lower BLER as a time domain equalizer (see FIG. 2) while considerably reducing the required complexity to the level of frequency domain solutions (see FIG. 3). Depending on the use-case and the available computational power the new solution can easily be adapted to minimize the complexity for a certain desired performance.

The methods, systems and devices described herein may be implemented as software in a Digital Signal Processor (DSP), in a micro-controller or in any other side-processor or as hardware circuit on a chip or within an application specific integrated circuit (ASIC). Aspects of the disclosure may be implemented in various ways, for example in discrete circuits, partially integrated circuits or fully integrated circuits or programming means.

Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 900 as described above with respect to FIG. 9 and the computing blocks of the equalizer 400 as described above with respect to FIG. 4. Such computer program product may include a readable non-transitory storage medium storing program code thereon for use by a processor, the program code comprising instructions for performing the method 900 as described above with respect to FIG. 9 or any of the blocks of the equalizer 400 described above with respect to FIG. 4.

EXAMPLES

The following examples pertain to further embodiments. Example 1 is an equalizer, comprising: a channel estimator configured to generate a set of time-domain channel coefficients based on a receive signal; a frequency-domain transformer configured to generate a set of frequency-domain channel coefficients based on a frequency transform of the set of time-domain channel coefficients; an equalizer coefficient generator configured to generate a set of frequency-domain equalizer coefficients based on the set of frequency-domain channel coefficients; a time-domain transformer configured to generate a set of time-domain equalizer coefficients based on a time transform of the set of frequency-domain equalizer coefficients; and a filter configured to filter the receive signal based on a filter function that is based on the set of time-domain equalizer coefficients.

In Example 2, the subject matter of Example 1 can optionally include that the frequency-domain transformer is configured to perform a Fast Fourier Transform (FFT) and the frequency transform is based on the FFT; and that the time-domain transformer is configured to perform an Inverse Fast Fourier Transform (IFFT) and the time transform is based on the IFFT.

In Example 3, the subject matter of Example 2 can optionally include that a size of the FFT is adjustable while filtering the receive signal by the filter.

In Example 4, the subject matter of any one of Examples 1-3 can optionally include a post-processor configured to post-process the set of time-domain equalizer coefficients by applying at least one of windowing, Hann windowing, and truncation.

In Example 5, the subject matter of Example 4 can optionally include a delay buffer configured to compensate for a delay of at least one of the channel estimator, the frequency-domain transformer, the equalizer coefficient generator, the time-domain transformer, and the post-processor.

In Example 6, the subject matter of any one of Examples 1-5 can optionally include that the filter comprises a finite impulse response (FIR) filter configured to perform a linear convolution of the receive signal based on the set of time-domain equalizer coefficients.

In Example 7, the subject matter of any one of Examples 1-6 can optionally include that the set of time-domain equalizer coefficients and the set of time-domain channel coefficients include a same number of coefficients.

In Example 8, the subject matter of any one of Examples 1-7 can optionally include that the time-domain transformer is configured to update the set of time-domain equalizer coefficients based on a block length of the time-domain transformer.

In Example 9, the subject matter of Example 8 can optionally include that the filter is configured to update the filter function with the updated set of time-domain equalizer coefficients based on the block length of the time-domain transformer.

In Example 10, the subject matter of any one of Examples 1-9 can optionally include that the equalizer coefficient generator is configured to generate the set of frequency-domain equalizer coefficients based on a minimum mean square error (MMSE) estimation.

In Example 11, the subject matter of any one of Examples 1-10 can optionally include that the channel estimator is configured to generate the set of time-domain channel coefficients based on a known reference signal pattern.

In Example 12, the subject matter of Example 11 can optionally include that the channel estimator is configured to generate the set of time-domain channel coefficients based on a correlation of a received pilot pattern comprised in the receive signal with the known reference signal pattern.

Example 13 is a method for equalizing a receive signal, the method comprising: generating a set of time-domain channel coefficients based on the receive signal; generating a set of frequency-domain channel coefficients based on a frequency transform of the set of time-domain channel coefficients; generating a set of frequency-domain equalizer coefficients based on the set of frequency-domain channel coefficients; generating a first set of time-domain equalizer coefficients based on a time transform of the set of frequency-domain equalizer coefficients; and filtering the receive signal based on a first filter function that is based on the first set of time-domain equalizer coefficients.

In Example 14, the subject matter of Example 13 can optionally include: generating a second set of time-domain equalizer coefficients based on the set of time-domain channel coefficients; and switching the filtering of the receive signal from a second filter function that is based on the second set of time-domain equalizer coefficients to the first filter function.

In Example 15, the subject matter of Example 13 can optionally include: post-processing the set of time-domain equalizer coefficients by applying at least one of windowing, Hann windowing, and truncation.

In Example 16, the subject matter of Example 13 can optionally include compensating for a delay of at least one of the following operations: generating the set of time-domain channel coefficients, generating the set of frequency-domain channel coefficients, generating the set of frequency-domain equalizer coefficients, generating the first set of time-domain equalizer coefficients and filtering.

Example 17 is a computer readable non-transitory medium on which computer instructions are stored which when executed by a computer, cause the computer to perform the subject matter of any one of Examples 13-16.

Example 18 is a hybrid equalization system, comprising: a channel estimation subsystem configured to generate a set of time-domain (TD) channel coefficients based on a receive signal; an FFT subsystem configured to generate a set of frequency-domain (FD) channel coefficients based on an FFT transform of the set of TD channel coefficients; an equalization subsystem configured to generate a set of FD equalizer coefficients based on the set of FD channel coefficients; an IFFT subsystem configured to generate a set of TD equalizer coefficients based on an IFFT transform of the set of FD equalizer coefficients; a delay buffering subsystem configured to delay the receive signal by a given system delay to generate a delayed receive signal; and a filtering subsystem configured to filter the delayed receive signal based on the set of TD equalizer coefficients by linear convolution in time domain.

In Example 19, the subject matter of Example 18 can optionally include that a size of the FFT transform is adjustable while filtering the delayed receive signal by the filtering subsystem.

In Example 20, the subject matter of Example 18 can optionally include that the filtering subsystem comprises a finite impulse response (FIR) filter.

In Example 21, the subject matter of Example 18 can optionally include a post-processing subsystem configured to post-process the set of TD equalizer coefficients before providing them to the filtering subsystem.

In Example 22, the subject matter of Example 21 can optionally include that the equalization subsystem is configured to generate the set of FD equalizer coefficients based on an LMMSE criterion.

In Example 23, the subject matter of Example 21 can optionally include: a second equalization subsystem configured to generate a second set of TD equalizer coefficients based on the set of TD channel coefficients; and a switching subsystem, configured to switch the set of TD equalizer coefficients or the second set of TD equalizer coefficients to the filtering subsystem for linear convolution with the delayed receive signal.

In Example 24, the subject matter of Example 23 can optionally include that the switching subsystem comprises a control input for controlling the switching of the set of TD equalizer coefficients or the second set of TD equalizer coefficients to the filtering subsystem.

Example 25 is a hybrid equalizer device for equalizing a receive signal, the device comprising: means for generating a set of time-domain channel coefficients based on the receive signal; means for generating a set of frequency-domain channel coefficients based on a frequency transform of the set of time-domain channel coefficients; means for generating a set of frequency-domain equalizer coefficients based on the set of frequency-domain channel coefficients; means for generating a first set of time-domain equalizer coefficients based on a time transform of the set of frequency-domain equalizer coefficients; and means for filtering the receive signal based on a first filter function that is based on the first set of time-domain equalizer coefficients.

In Example 26, the subject matter of Example 26 can optionally include: means for generating a second set of time-domain equalizer coefficients based on the set of time-domain channel coefficients; and means for switching the filtering of the receive signal from a second filter function that is based on the second set of time-domain equalizer coefficients to the first filter function.

Example 27 is a hybrid equalizer, comprising: a channel estimator configured to generate a set of time-domain (TD) channel coefficients based on a receive signal; an FFT processor configured to generate a set of frequency-domain (FD) channel coefficients based on an FFT transform of the set of TD channel coefficients; an equalizer coefficient generator configured to generate a set of FD equalizer coefficients based on the set of FD channel coefficients; an IFFT processor configured to generate a set of TD equalizer coefficients based on an IFFT transform of the set of FD equalizer coefficients; a delay buffer configured to delay the receive signal by a given system delay to generate a delayed receive signal; and a filter configured to filter the delayed receive signal based on the set of TD equalizer coefficients by linear convolution in time domain.

In Example 28, the subject matter of Example 27 can optionally include that a size of the FFT transform is adjustable while filtering the delayed receive signal by the filter.

In Example 29, the subject matter of Example 27 can optionally include that the filter comprises a finite impulse response (FIR) filter.

In Example 30, the subject matter of Example 27 can optionally a post-processor configured to post-process the set of TD equalizer coefficients before providing them to the filter.

In Example 31, the subject matter of Example 30 can optionally include that the post-processor is configured to process the set of TD equalizer coefficients by windowing.

In Example 32, the subject matter of Example 30 can optionally include that the post-processor is configured to process the set of TD equalizer coefficients by truncation.

In Example 33, the subject matter of Example 30 can optionally include that the equalizer coefficient generator is configured to generate the set of FD equalizer coefficients based on an LMMSE criterion.

In Example 34, the subject matter of Example 30 can optionally include a second equalizer coefficient generator configured to generate a second set of TD equalizer coefficients based on the set of TD channel coefficients; and a switch, configured to switch the set of TD equalizer coefficients or the second set of TD equalizer coefficients to the filter for linear convolution with the delayed receive signal.

In Example 35, the subject matter of Example 34 can optionally include that the switch comprises a control input for controlling the switching of the set of TD equalizer coefficients or the second set of TD equalizer coefficients to the filter.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. An equalizer, adapted to equalize a receive signal for use in a mobile system, comprising:
a channel estimator configured to generate a set of time-domain channel coefficients based on a receive signal;
a frequency-domain transformer configured to generate a set of frequency-domain channel coefficients based on a frequency transform of the set of time-domain channel coefficients;
an equalizer coefficient generator configured to generate a set of frequency-domain equalizer coefficients based on the set of frequency-domain channel coefficients;
a time-domain transformer configured to generate a set of time-domain equalizer coefficients based on a time transform of the set of frequency-domain equalizer coefficients;
a filter configured to filter the receive signal in the time domain based on a filter function that is based on a post-processed version of the set of time-domain equalizer coefficients, wherein the filter comprises a time-domain filter, and a post-processor coupled between the time-domain transformer and the filter, and configured to post-process the set of time-domain equalizer coefficients from the time-domain transformer by applying windowing in the time domain, to form the post-processed version of the set of time-domain equalizer coefficients, and provide the post-processed version of the set of time-domain equalizer coefficients to the filter comprising the time-domain filter;
wherein the frequency-domain transformer is configured to perform a Fast Fourier Transform (FFT), and the frequency transform is based on the FFT, wherein the post-processor is further configured to adjust an equalizer length used by the equalizer coefficient generator to be a predetermined length that is different from an FFT length used by the frequency-domain transformer to adaptively truncate the generated frequency-domain equalizer coefficients, and
wherein a size of the FFT is adjustable while filtering the receive signal by the filter.

2. The equalizer of claim 1,
wherein the time-domain transformer is configured to perform an Inverse Fast Fourier Transform (IFFT) and the time transform is based on the IFFT.

3. The equalizer of claim 1,
wherein the post-processor is configured to post-process the set of time-domain equalizer coefficients by applying Hann windowing.

4. The equalizer of claim 1, further comprising:
a delay buffer configured to compensate for a delay of at least one of the channel estimator, the frequency-domain transformer, the equalizer coefficient generator, the time-domain transformer, and the post-processor.

5. The equalizer of claim 1,
wherein the filter comprises a finite impulse response (FIR) filter configured to perform a linear convolution of the receive signal based on the set of time-domain equalizer coefficients.

6. The equalizer of claim 1,
wherein the set of time-domain equalizer coefficients and the set of time-domain channel coefficients include a same number of coefficients.

7. The equalizer of claim 1,
wherein the time-domain transformer is configured to update the set of time-domain equalizer coefficients based on a block length of the time-domain transformer.

8. The equalizer of claim 1,
wherein the equalizer coefficient generator is configured to generate the set of frequency- domain equalizer coefficients based on a minimum mean square error (MMSE) estimation.

9. The equalizer of claim 1,
wherein the channel estimator is configured to generate the set of time-domain channel coefficients based on a known reference signal pattern.

10. The equalizer of claim 1, wherein the equalizer length adjusted by the post-processor has a size L, and wherein the length M of the FFT is selected by determining a smallest value m to meet the condition $M=2m \geq L$.

11. The equalizer of claim 7,
wherein the filter is configured to update the filter function with the updated set of time-domain equalizer coefficients based on the block length of the time-domain transformer.

12. The equalizer of claim 9,
wherein the channel estimator is configured to generate the set of time-domain channel coefficients based on a correlation of a received pilot pattern comprised in the receive signal with the known reference signal pattern.

13. A method for equalizing a receive signal, the method comprising:
generating a set of time-domain channel coefficients based on the receive signal;
generating a set of frequency-domain channel coefficients based on a frequency transform of the set of time-domain channel coefficients;
generating a set of frequency-domain equalizer coefficients based on the set of frequency-domain channel coefficients;
generating a first set of time-domain equalizer coefficients based on a time transform of the set of frequency-domain equalizer coefficients;
filtering the receive signal in the time domain, at a time domain filter, based on a first filter function that is based on a post-processed version of the first set of time-domain equalizer coefficients, and post-processing the first set of time-domain equalizer coefficients by applying windowing in the time domain, at a post processor, to form the post-processed version of the first set of time-domain equalizer coefficients, to be provided to the time-domain filter;
wherein the frequency transform is performed in accordance with a Fast Fourier Transform (FFT),
wherein the act of post-processing includes adjusting an equalizer length used to generate the set of frequency-domain equalizer coefficients to be a predetermined length that is different from an FFT length used to generate the set of frequency-domain channel coefficients to adaptively truncate the generated set of frequency-domain equalizer coefficients, and
wherein a size of the FFT is adjustable while filtering the receive signal by the filter.

14. The method of claim 13, further comprising:
generating a second set of time-domain equalizer coefficients based on the set of time- domain channel coefficients; and
switching the filtering of the receive signal from a second filter function that is based on the second set of time-domain equalizer coefficients to the first filter function.

15. The method of claim 13, further comprising:
post-processing the set of time-domain equalizer coefficients by applying Hann windowing.

16. The method of claim 13, further comprising:
compensating for a delay of at least one of the following operations:
generating the set of time-domain channel coefficients, generating the set of frequency-domain channel coefficients, generating the set of frequency-domain equalizer coefficients, generating the first set of time- domain equalizer coefficients and filtering the receive signal.

17. A hybrid equalizer, adapted to equalize a receive signal for use in a mobile system, comprising:
a channel estimator configured to generate a set of time-domain (TD) channel coefficients based on a receive signal;
a Fast Fourier Transform (FFT) processor configured to generate a set of frequency-domain (FD) channel coefficients based on an FFT transform of the set of TD channel coefficients;
an equalizer coefficient generator configured to generate a set of FD equalizer coefficients based on the set of FD channel coefficients;
an IFFT processor configured to generate a set of TD equalizer coefficients based on an IFFT transform of the set of FD equalizer coefficients;
a delay buffer configured to delay the receive signal by a given system delay to generate a delayed receive signal;
a filter configured to filter the delayed receive signal based on a post-processed version of the set of TD equalizer coefficients by linear convolution in time domain, wherein the filter comprises a time-domain filter, and
a post-processor coupled between the IFFT processor and the filter, and configured to post-process the set of TD equalizer coefficients from the IFFT processor by applying windowing in the time domain, to form the post-processed version of the set of TD equalizer coefficients, and provide the post-processed version of the set of TD equalizer coefficients to the filter comprising the time-domain filter;
wherein the post-processor is further configured to adjust an equalizer length used by the equalizer coefficient generator to be a predetermined length that is different from an FFT length used by the FFT processor to adaptively truncate the generated of FD equalizer coefficients, and
wherein a size of the FFT transform is adjustable while filtering the delayed receive signal by the filter.

18. The hybrid equalizer of claim 17,
wherein the filter comprises a finite impulse response (FIR) filter.

19. The hybrid equalizer of claim 17,
wherein the post-processor is configured to process the set of TD equalizer coefficients by applying Hann windowing.

20. The hybrid equalizer of claim 17,
wherein the equalizer coefficient generator is configured to generate the set of FD equalizer coefficients based on an LMMSE criterion.

21. The hybrid equalizer of claim 17, comprising:
a second equalizer coefficient generator configured to generate a second set of TD equalizer coefficients based on the set of TD channel coefficients; and
a switch, configured to switch the set of TD equalizer coefficients or the second set of TD equalizer coefficients to the filter for linear convolution with the delayed receive signal.

22. The hybrid equalizer of claim 21,
wherein the switch comprises a control input for controlling the switching of the set of TD equalizer coefficients or the second set of TD equalizer coefficients to the filter.

23. A method for equalizing a receive signal, the method comprising:
generating a set of time-domain (TD) channel coefficients based on the receive signal;
generating a set of frequency-domain (FD) channel coefficients based on an FFT transform of the set of TD channel coefficients;
generating a set of FD equalizer coefficients based on the set of FD channel coefficients;
generating a set of TD equalizer coefficients based on an inverse FFT transform of the set of FD equalizer coefficients;
delaying the receive signal by a given system delay to generate a delayed receive signal;

filtering the delayed receive signal, at a time-domain filter, based on a post-processed version of the set of TD equalizer coefficients by linear convolution in time domain, and post-processing the set of TD equalizer coefficients by applying windowing in the time domain, at a post processor, to form the post-processed version of the set of TD equalizer coefficients, to be provided to the time-domain filter;

wherein the act of post-processing includes adjusting an equalizer length used for generating the set of FD equalizer coefficients to be a predetermined length that is different from an FFT length used for generating the set of FD channel coefficients to adaptively truncate the generated set of FD equalizer coefficients, and adjusting a size of the FFT transform while filtering the delayed receive signal.

* * * * *